Sept. 11, 1928.                                                          1,684,191
                         W. G. MYLIUS ET AL
                    ELECTRICAL MEASURING INSTRUMENT
                       Filed March 17, 1927

WITNESSES:                                              INVENTORS
                                                     Walter G. Mylius &
                                                     Charles M. Hoeftman.
                                                            BY
                                                          ATTORNEY Patented Sept. 11, 1928.

1,684,191

UNITED STATES PATENT OFFICE.

WALTER G. MYLIUS, OF WILKINSBURG, PENNSYLVANIA, AND CHARLES M. HOEFTMAN, OF NEWARK, NEW JERSEY, ASSIGNORS TO WESTINGHOUSE ELECTRIC AND MANUFACTURING COMPANY, A CORPORATION OF PENNSYLVANIA.

ELECTRICAL MEASURING INSTRUMENT.

Application filed March 17, 1927. Serial No. 176,078.

Our invention relates to electrical measuring instruments and more particularly to light-load adjusting devices for induction watthour meters.

Our invention has for its object to provide a light-load adjusting device that shall be unaffected by vibration and remain in its adjusted position.

Another object of our invention is to provide a device of the character indicated that shall be effective in its operation.

A further object of our invention is to provide a light-load adjusting device that shall be firmly mounted on the electromagnetic core with which it co-operates.

It is well known that an auxiliary torque may be developed in an induction meter by a metallic loop placed parallel to the disc and in inductive relation to the voltage coil but displaced laterally therefrom. Such a device is used to compensate for friction in the gear train and in the main bearing. A constant torque is produced by the shifting magnetic field established by the voltage flux and the flux caused by the currents induced in the loop by the alternating voltage flux.

Various devices have been employed to accomplish the above result but they have been structurally weak. One such device consisted of a thin piece of copper plate disposed in the air gap. The device of that design gave a satisfactory range of light-load adjustment but the thin piece of copper was easily distorted when the meter was repaired or subjected to undue vibration. Since the air gap in which the plate was disposed was relatively narrow the distorted plate presented the possibility of striking and thereby retarding the disc.

Another decided disadvantage (in substantially all former types of light-load adjusting devices) was also present by virtue of the fact that it was necessary to clamp the adjusted element after each adjustment in order to obviate a change in the adjustment.

Another disadvantage common to former light-load adjusting devices was the insecure mounting of such devices upon their supports. Insecure and loosely mounted devices might be shaken out of adjustment by unusual vibration of the instrument in shipment and handling.

According to our invention, the above mentioned disadvantages are substantially avoided by mounting a light-load adjusting device on brackets projecting from, and forming an integral part of, the electromagnetic core. We provide means whereby the lightloap loop is held in effective engagement with the core itself, thereby rendering the device accurate in adjustment, secure in mounting and safe from injury. Our invention, in addition, embodies an extremely simple manufacturing assembly.

For a further understanding of our invention, reference may be had to the accompanying drawings in which, Fig. 1 is a diagrammatic view of an electromagnetic core of an induction meter embodying our invention;

Figure 1:
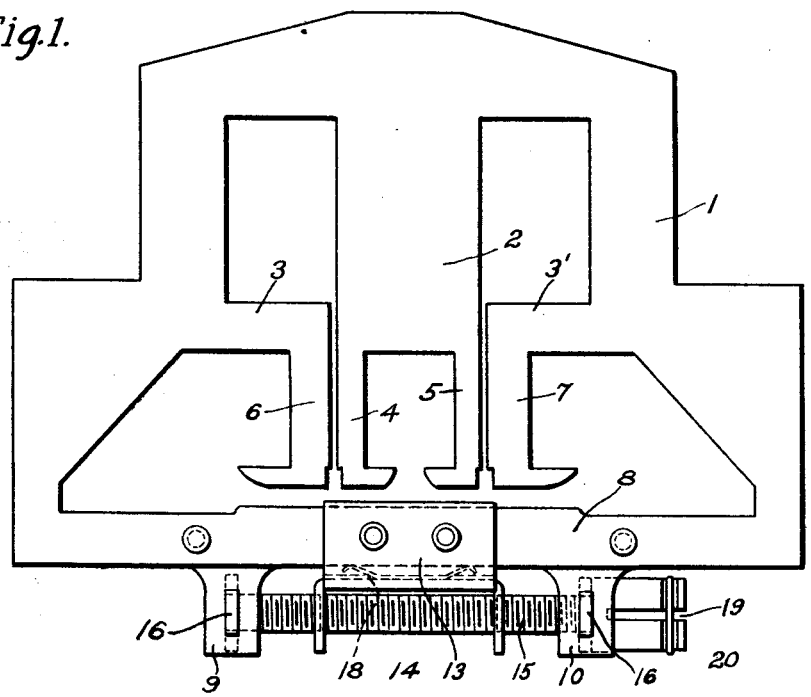
Figure 2:
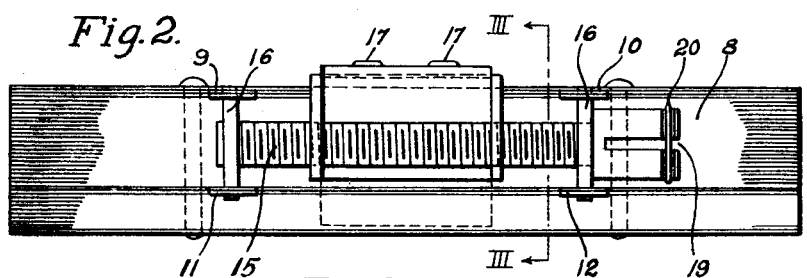
Fig. 2 is a bottom view of Fig. 2.
Figure 3:
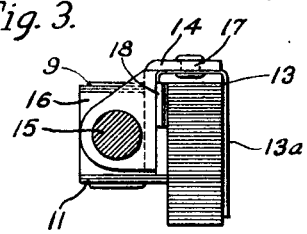
Fig. 3 is a cross-sectional view taken on the line III—III of Fig. 2.

A laminated core 1 of an electrical measuring instrument is provided with a central inwardly extending member 2 for a voltage winding and inwardly extending side members 3 and 3'. The central member 2 is slotted, in its lower portion, to provide projections 4 and 5 that are adapted to cooperate with extensions 6 and 7 of the members 3 and 3', respectively, to constitute cores for current windings. The core 1 is provided with a member 8 that is adapted to form a common flux-return path for flux that may traverse the member 2 and the members 4, 5, 6 and 7. The member 8 is separated from the latter members by an air gap through which a disk or armature (not shown) is provided to be actuated by the cooperation of voltage and current fluxes, in a well known manner.

In accordance with our invention, several of the laminations comprising the core 1 are provided with extensions 9, 10, 11 and 12 that serve as brackets, when the laminations are stacked and riveted together to form the complete core 1. Their extensions or brackets are integral parts of the several laminations from which they extend. After the laminations are assembled and secured to form the complete core, the extensions provide rigid and structurally strong brackets. A distinct advantage in forming brackets in this manner arises from the fact that any number of electromagnets may be assembled to have exactly similar brackets and bracket clearances and thus be interchangeable.

The light-load adjusting device is mounted on the brackets and comprises a conducting plate 13, a carrier 14, a lead screw 15 and supporting members 16.

The supporting members 16 are press-fitted into openings provided therefor in the brackets and riveted in place and are adapted to cooperatively support the extremities of the screw 15. The carrier 14 is adapted to be moved horizontally by rotation of the screw 15. The conducting plate 13 is rigidly secured to the carrier 14 by rivets 17 and is adapted to frictionally engage the inner surface of the member 8 of the electromagnetic core. A spring 18 formed from, and constituting a part of, the plate 13 frictionally engages the outer surface of the member 8 to coact with the inner portion 13a of the conducting plate 13 to produce a slidable clamping effect, whereby the conducting plate will remain in position unless moved by rotation of the screw 15.

The screw 15 is provided with a slot 19 and a ring 20 on its periphery to receive external operating means for adjusting the position of the lead screw and the plate 13.

The plate 13 is moved to the right or to the left, as desired, by rotation of the screw 15, until a position of correct adjustment is found, at which position the plate 13 will be held by the friction of the spring 18 until another adjustment is necessary.

A novel feature of the device is the method of supporting the light-load adjustment device in mechanical engagement with the electromagnetic core; an expedient that has been heretofore unused in the art, but one that produces a result long sought for, namely, a simple but effective light-load adjustment device of rigid construction that will remain fixed in its adjusted position.

While we have illustrated our invention in a particular application for purposes of explanation, we do not wish to be so limited. Various modifications may be made in our invention without departing from the spirit and scope of the invention, as set forth in the appended claims.

We claim as our invention:—

1. An electric meter comprising a laminated electromagnetic core, bracket members comprising extensions of certain laminations of the core member, a movable carrier, a conducting plate secured to said carrier, a screw operatively connected to the movable carrier and means for supporting the said screw on the bracket members.

2. An electric meter comprising a laminated electromagnetic core having current pole pieces and voltage pole pieces disposed on one side of an air gap and a flux-return-path member on the other side of the air gap, bracket members comprising extensions of several laminations of the core member, a movable carrier, a conducting plate secured to said carrier and adapted to move in the air gap and resiliently engage the said return-path-member, and means for adjustably mounting the movable carrier on the said bracket members.

3. A light-load adjusting device for electric meters comprising a core member having extensions therefrom, a movable carrier, a conducting plate of substantially U-shape secured to said movable carrier and adapted to frictionally engage the core member, and means for adjustably mounting the movable carrier on the said extensions.

4. An electric meter comprising a laminated electromagnet having an air gap and a side member, bracket members comprising certain laminations of the core member extending from the side member, a movable carrier adjustably mounted on the bracket members, a conducting plate secured to said carrier and a spring secured to the said plate and frictionally engaging the said side member.

5. An electric meter comprising a laminated electromagnetic core, bracket members extending therefrom, said bracket members comprising extensions of certain laminations of the core member, a light-load adjustment device and means for mounting the light-load adjustment device on said bracket members.

6. In an electric meter, the combination with a laminated electromagnetic core, of a light-load adjustment device comprising a conducting plate, a carrier therefor provided with threaded projections, a screw adapted to engage said threaded projections, brackets consisting of extensions of several of the laminations and means for mounting the screw on said brackets.

7. In an electric meter, voltage core pole pieces and current core pole pieces, a common flux-return-path member therefor, and a flux-shifting device between the poles and the return-path member comprising a conducting plate of substantially U-shape frictionally engaging the said return-path member and adjustably mounted thereon.

8. In an electric meter, the combination with a laminated electromagnetic core, of a light-load adjusting device comprising a conducting plate, a movable carrier therefor having threaded projections thereon, a bracket consitsing of extensions of laminations of the said core, a screw adapted to fit said threaded projections of said carrier, and means for mounting the said screw on the said bracket.

In testimony whereof, we have hereunto subscribed our names this 4th day of March, 1927 and this 7th day of March, 1927, respectively.

WALTER G. MYLIUS.
CHAS. M. HOEFTMAN.